United States Patent

[11] 3,619,435

| [72] | Inventor | Henry Kepper |
| | | Heemstede, Netherlands |
| [21] | Appl. No. | 753,369 |
| [22] | Filed | Aug. 19, 1968 |
| [45] | Patented | Nov. 9, 1971 |
| [73] | Assignee | Dorr-Oliver Incorporated |
| | | Stamford, Conn. |

[54] METHOD OF THERMALLY BLOATING CLAY PELLETS USING A FLUIDIZED BED
3 Claims, 7 Drawing Figs.

[52] U.S. Cl. ............................................. 264/43,
106/40, 264/44, 264/DIG. 39, 264/DIG. 51
[51] Int. Cl. ....................................... C04b 21/00,
C04b 21/02, C04b 33/32
[50] Field of Search.......................................... 264/42, 43,
44; 106/122, 40, 41

[56] References Cited
UNITED STATES PATENTS

| 2,052,324 | 8/1936 | Thomson | 264/42 |
| 2,786,772 | 3/1957 | Stewart et al. | 264/43 |
| 2,810,810 | 10/1957 | White | 264/43 |
| 3,274,309 | 9/1966 | Schreieck | 264/42 |
| 3,328,180 | 6/1967 | Ban | 264/44 |
| 3,409,450 | 11/1968 | Weber et al. | 264/42 |
| 2,586,818 | 2/1952 | Harms | 259/4 |

OTHER REFERENCES
N. F. Mohler(Ed.), " New Concept In Clay Products Now A Reality," May, 1964, Brick & Clay Record, at 36– 39.

*Primary Examiner*—Julius Frome
*Assistant Examiner*—John H. Miller
*Attorneys*—Theodore M. Jablon, William J. Fox, George S. Hastings and D. M. Mezzapelle ABSTRACT: Method for producing expanded lightweight aggregate by heat-treating prepared predried clay pellets or the like in a fluidized bed maintained by hot gases, assisted by additional radiating heat directed downwardly upon the bed, with means for separately controlling the amount of radiating heat, and the bed temperature, whereby the bed temperature is maintained substantially below the surface sintering temperature of the pellets, but above the temperature required to expand the pellets.

The upflow rate or velocity of gases in the fluid bed are controlled in such a manner that the pellets are constantly raised to the surface where the downwardly directed radiant heat forms a sintered or glassy outer skin on the expanded pellets. The turbulence caused by the controlled velocity of the gasses then causes these pellets to be circulated back down into the fluidized layer so that all of the expanded pellets are exposed to the radiant heat momentarily and repetitiously as they pass through the fluid bed furnace. The expanded pellets are cooled in the final section of the fluid bed furnace.

INVENTOR.
HENRY KEPPER
BY Theodore M. Jablon
ATTORNEY.

INVENTOR.
HENRY KEPPER
BY Theodore M Jablon
ATTORNEY.

INVENTOR.
HENRY KEPPER
BY Theodore M. Jablon

METHOD OF THERMALLY BLOATING CLAY PELLETS USING A FLUIDIZED BED

This invention relates to the heat treatment of prepared clay pellets, for the purpose of converting them into expanded porous hardened bodies or spheres which may be embodied as a lightweight aggregate into concrete blocks or structures or the like.

In order to produce these lightweight bodies or spheres, the "green" clay pellets supplied as of suitable size must be subjected to the heating process within a critical temperature range for a critical length of time, such factors depending upon the nature and characteristics of the clay material. These treatment conditions should preferably be so controlled that the resulting lightweight bodies have maximum expansion or porosity combined with optimum hardness, while acquiring a sintered or glassy outer skin.

In order to produce these lightweight bodies or spheres of desirable characteristics, the clay pellets supplied within a suitable narrow range of sizes, must be subjected to the heat treatment process for a critical length of time at critical temperatures. The desired sintering temperature of, say 1100° to 1200° C. should be attained rapidly perhaps within seconds, in order that the sintered surface skin may be formed quick enough to prevent uninhibited escape of expanding gases generated within, and responsible for the porous structure of the resulting expanded body or sphere.

It should thus be understood that the expansion is effected largely by the gases which cannot penetrate the sintered outer skin, thus causing the expansion of the now heat-softened or pryoplastic clay. These gases are generated due to the heat vaporization of various organic constituents and of combined water in the pellets, as well as due to chemical transformation.

Since gases may develop well below 700° C., that is well before the sintering temperature of about 1100° C. is attained, if the heating is too gradual, much of the expansion potential will be lost due to escape of gases before an effective sintered outer skin is formed. Rapid attainment of the surface sintering temperature is therefore advantageous and desirable. Moreover, rapid temperature rise in this temperature range, rather than a more gradual or linear increase, produces a more stable or better developed outer skin, providing higher crush resistance of the sphere without weight increase.

In order to produce the expanded bodies or spheres having the aforementioned desired characteristics of porosity and lightness combined with strength and crush resistance, this invention provides a novel method and apparatus for heat-treating the prepared or clay pellets in a continuous operation, and in a manner whereby temperature and detention time are closely and rapidly, as well as independently controllable, and a rapid rise to sintering temperature of the pellet surface is attainable.

The invention furthermore, by more carefully sustained transportation of the material in the heat treatment phase, aims to avoid the rough fall-and-tumble manner of previous continuous treatment systems such as rotary cylindrical kilns, or the like, thus minimizing abrasive losses in terms of undesired fines. Concurrently, the invention aims to expose the material uniformly to the heating phase, resulting in a product that is neither overburned nor underburned, while moving the material through the heat treatment zone in such a manner as to prevent the sticking of the material to hot or overheated walls of a heat treatment chamber.

To attain the foregoing objectives, this invention proposes to move the prepared pellets of clay or similar expandable material continuously through a heat treatment zone wherein they are maintained in a fluidized state for a controlled period of time under controlled temperature conditions. Hot fluidizing gases forced upwardly through a constriction plate or the like maintain thereon a bed of the material in a fluidized state, that is a condition wherein the material sustained by the gases at a suitable upflow rate behaves and moves substantially like a liquid.

According to the invention, the bed of fluidized material for instance, in sizes ranging from one-eighth to five-eighth inch, is operated in such a manner that the material is preheated to a temperature kept well below a clay sintering temperature of perhaps 1100° C., by a fluidizing gas of, say, 900°. Simultaneously, supplemental and readily controllable radiant heat is directed downwardly upon the bed of fluidized material passing through the heat treatment zone or chamber.

In this way, the particles in the everchanging top layer of the bed, the pellets or spheres constantly rising to the top will receive radiant heat to an extent that will raise the surface temperature of the particles to the sintering point, thus enclosing them in a skin of sintered material, while preventing the material from sticking to overheated walls of the heat treatment zone or reaction chamber, while the bed temperature itself is maintained at said lower preheating temperature.

Preferably, the material which has been predried by spent treatment - and combustion gases, is caused to move or flow over an elongated constriction plate which constitutes the bottom of a trough-shaped or tunnel-shaped reaction chamber. The feed pellets introduced at one end of the trough-shaped bed are transported by the fluid characteristics of the bed to the other end, while passing underneath a radiation ceiling comprising one or more secondary burners preferably of the gas-fired flameless heat radiating type. While thus in transit from end to end of the bed each pellet exposed to radiation and convection derived from the supplemental source is heated to its final expanding and surface sintering temperature.

During the last part of its horizontal movement in a fluidized state, provision may be made for the expanded bodies or spheres to be cooled by a rising stream of air, to insure that sticking together of the particles after discharging is avoided. The cool air quenches not only the particles, but also the exhaust gases of the heating stage with the advantage that part of the gases can be utilized for drying the "green" pellets from the pelletizing step.

Other features and advantages will hereinafter appear.

As this invention may be embodied in several forms without departing from the spirit or essential characteristics thereof, the present embodiment is illustrative and not restrictive. The scope of the invention is defined by the appended claims rather than by the description preceding them, and all embodiments which fall within the meaning and range of equivalency of the claims are therefore intended to be embraced by those claims.

Figure 1:
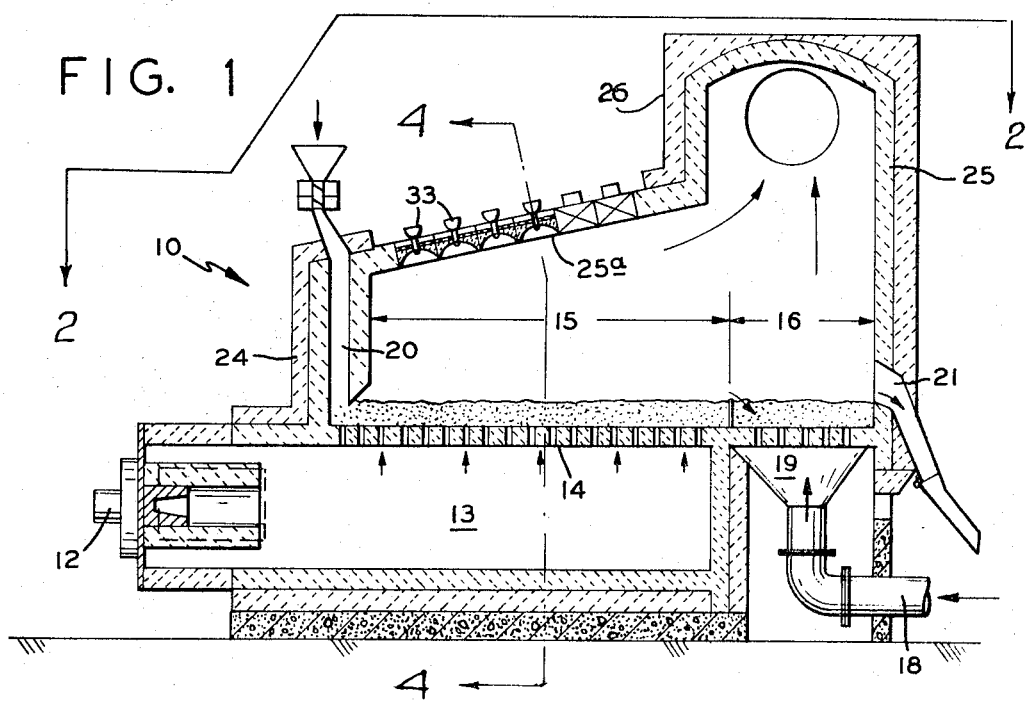
FIG. 1 is a vertical longitudinal section of a treatment unit for carrying out the heat treatment of the clay pellets in a fluidized bed with hot fluidizing gases supplemented by radiating heat provided by downwardly directed radiant heat type gas burners.
Figure 2:
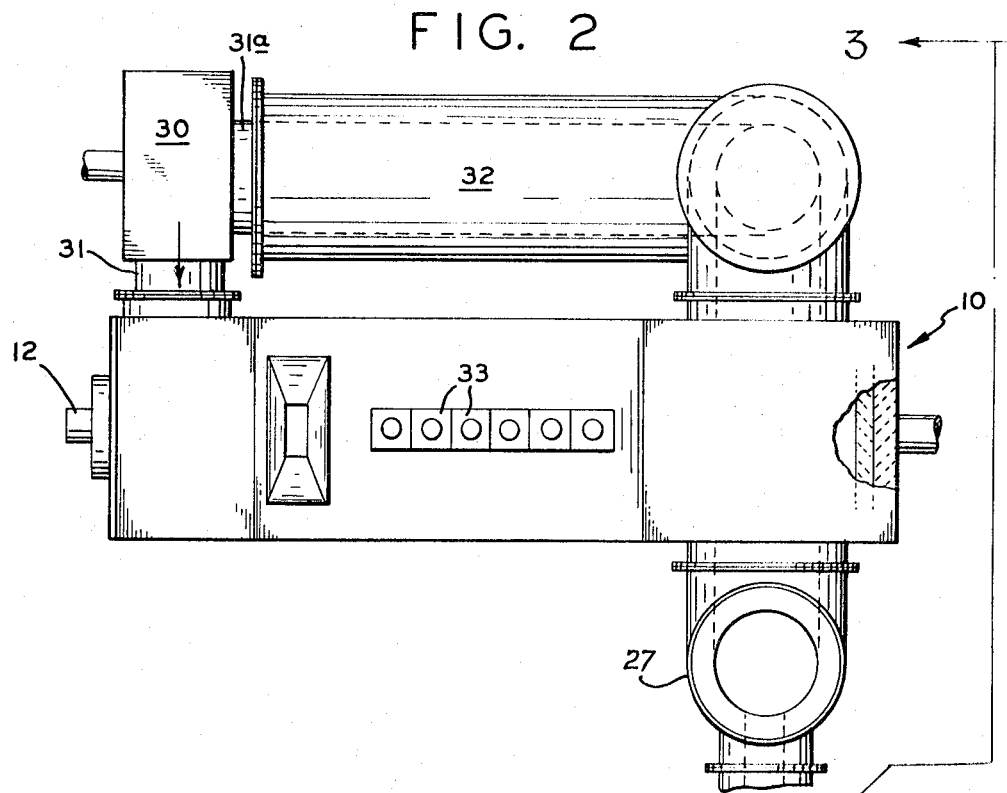
FIG. 2 is a plan view of the treatment unit of FIG. 1, taken on line 2—2 of FIG. 1.
Figure 3:
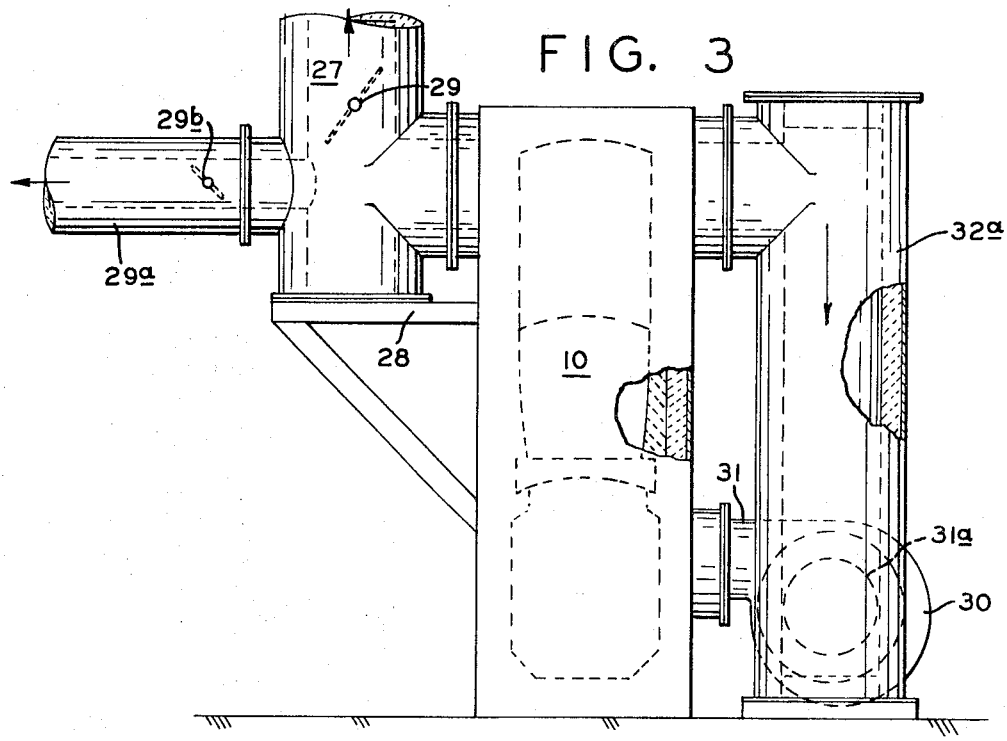
FIG. 3 is an end view of the treatment unit, taken on line 3—3 of FIG. 2.
Figure 4:
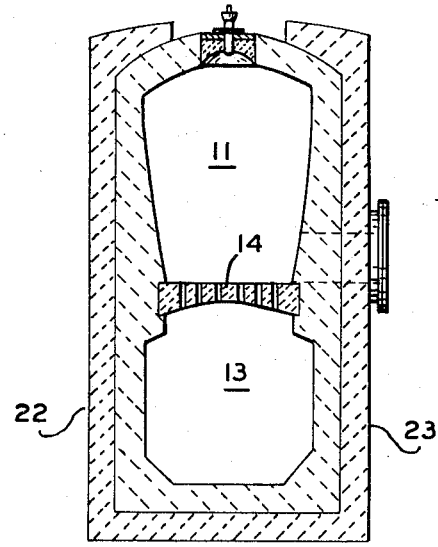
FIG. 4 is a transverse sectional view of the treatment unit, taken on line 4—4 of FIG. 1.

Clay pellets having been formed in a pelletizing operation preferably of substantially uniform particle size ("green" pellets) and then predried, are supplied continuously to the heat treatment unit 10 of this invention. While passing through this unit the pellets are converted, under closely controllable conditions, into expanded lightweight bodies or spheres of desired characteristics, usable in a lightweight aggregate or as insulation.

The heat treatment unit 10 comprises an elongate or tunnel-shaped heat treatment chamber 11 receiving the prepared pellets at one end, and delivering the resulting expanded bodies or spheres at the other end. The pellets passing through the treatment chamber are maintained in a state of fluidization by hot fluidizing gases provided by a burner 12, and rising from a wind box 13 through an elongate constriction plate 14. In this way, the pellets are moved along through the horizontal treatment zone with minimum of abrasion.

The treatment chamber in this example comprises a main heat treatment section or zone 15, and an adjoining terminal cooling section or zone 16. Functionally these treatment zones are separated from each other by a transverse low partition or weir 17 allowing the fluidized material to flow or spill over from the heat treatment zone directly into the cooling zone. Cooling air rises through the constriction plate in the cooling zone from a duct 18 connected to a wind box 19, reducing the temperature of the pellets sufficiently to avoid sticking together of the finished expanded bodies after delivery from the treatment unit.

Fresh pellets gravitating into the feed end of the treatment chamber through a vertical supply duct 20 travel the length of the bed in the fluidized state, and across the weir, to an outlet 21 the location of which determines the depth of the bed of fluidized material.

The treatment chamber 11 and wind box 13 have parallel side walls 22 and 23, an inlet end wall 24 containing the vertical supply duct for the pellets, and an opposite outlet wall 25.

The heat treatment section of the unit has a roof 25a sloping upwardly from the inlet end to join an upward extension or dome 26 of the treatment chamber located above the cooling zone.

The spent fluidizing gases from the heat treatment zone join the spent cooling air in the cupola or dome for delivery into a stack 27 shown to be mounted on bracket 28 laterally of the treatment unit. A damper 29 in the stack may be operated in order to divert at least a portion of the stack gases through duct 29a for the purpose of predrying and conditioning the pellets prior to their entry into the heat treatment chamber of the unit. A damper 29b may also be provided in duct 29a.

Provision is also made for recirculating the spent gas mixture from the treatment chamber into wind box 13 by means of a blower 30 having its delivery end 31 connected to the wind box near the burner, and its intake end 31a connected to the cupola opposite from the stack. For this recirculation there is provided a duct system which comprises a horizontal section 32 and a vertical or stand pipe section 32a.

This duct system may be in the nature of refractory-lined and insulated steel tubing connected to the refractory-lined and insulated steel casing of the treatment unit.

According to the invention, a row of radiant heat type gas burners 33 (for example the type shown in bulletin BP-7-67 of the Selas Corporation of America, Dresher, Pennsylvania) is mounted in the sloping roof of the heat treatment chamber, so that the downwardly directed heat radiation will reach the everchanging particles or pellets rising to the surface of the fluidized bed. In this way, the pellets are individually momentarily and repetitiously exposed to the radiant heat to an extent that will cause the surface of the particles to sinter, thus forming around these particles a substantially nonpermeable glassy skin, while preserving an internal porous structure of the pellet formed due to the thus confined gas expansion within the pellet. Another suitable radiant gas burner is that put out by the Hauck Manufacturing Company of Lebanon, Pennsylvania and illustrated in its bulletin GB809FC–GB8 09FC–BD3.

The temperature of the hot fluidizing gases is closely controllable in such a manner as to maintain the bed itself at a suitable preheating temperature, that is a temperature substantially below the sintering temperature of the clay pellets, even as radiating heat from the overhead radiant type gas burners is directed onto the surface of the bed. This radiant heat is closely and instantly controllable by the operation of the burner, in such a manner that the surface of the everchanging particles or pellets appearing at the surface of the bed, can be brought to sintering temperature, even though a lower nonsintering temperature is being currently maintained in the bed itself. As an example, for a suitable type of clay to produce expanded pellets of suitable characteristics of lightweight and crush-resisting strength, a bed temperature of about 900° C. to 950° C. may be maintained concurrently with a sintering temperature of about 1100° C. at the surface of the pellets.

According to the invention, the aforementioned temperature condition, as well as the duration of exposure of the pellets to those conditions, are closely, and critically, as well as independently controllable for the purpose of obtaining optimum results. That is to say, there are provided independently operable controls for the bed temperature, the sintering temperature, and the exposure time, all correlated to one another, for the purpose of delivery of a uniform product of desired characteristics, at a minumum of abrasion.

Figure 5:
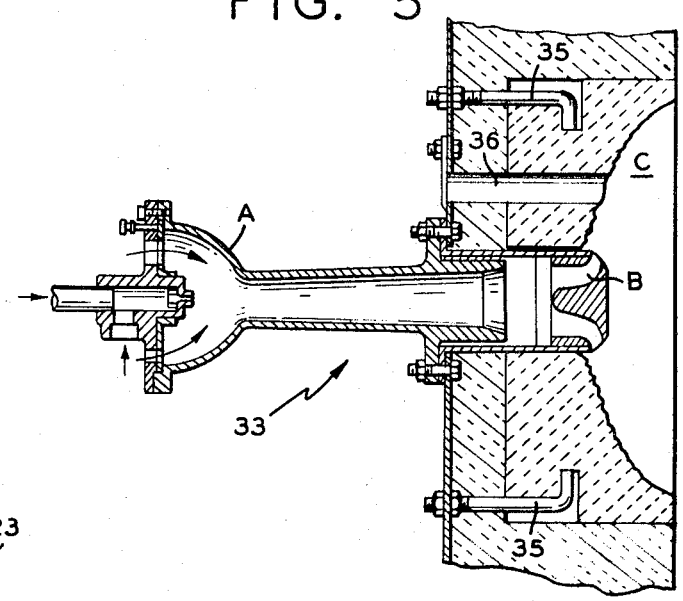
FIG. 5 is an enlarged detail sectional view of one of the radiant heat gas burners.

The bed temperature is controlled by the temperature of the fluidizing gases, while the exposure time is regulated by the rate of feed of the pellets into the fluidized bed, and by the depth of the bed. The critical sintering temperature on the surface of the pellets is closely maintainable by the closely controllable heat radiation from the radiant type gas burners 33 one of which is shown enlarged in FIG. 5, and described as follows:

The burner has three principal parts. The fuel gas flows through an orifice inducing the required volume of air through the venting inspirator (A) where the combined gas and air stream is thoroughly mixed. This mixture passes through the burner tip (B) and burns as it sweeps radially across the surface of the parabolic-shaped refractory cup (C).

The inner contour of the cup is shaped so that its surface is always washed by the hottest portion of the flame. This continuous process causes the cup to become radiant and to beam heat to the surfaces exposed to its rays. All combustion is completed within the cup, preventing delayed uncontrolled combustion. Radiant heat is transferred through the space above the bed directly and uniformly according to the law of radiation. Moreover, the burner cup immediately responds to changes, so that the intensity of radiation is instantaneously controllable. The burner unit is anchored to the steel shell of the treatment unit as indicated by anchoring bolts 35, and has a sight opening 36.

A burner of this type has the ability, through complete combustion of the gas/air mixture to produce a highly controllable heat flow over widely varying conditions. Such instant control is of practical importance in the operation of this invention, in view of the critical shortness of the exposure time required for optimum results. Depending upon the nature of the pellet material, the exposure time may be in the order of about 5 to 7 minutes, and possibly only in the order of seconds.

Figure 6:
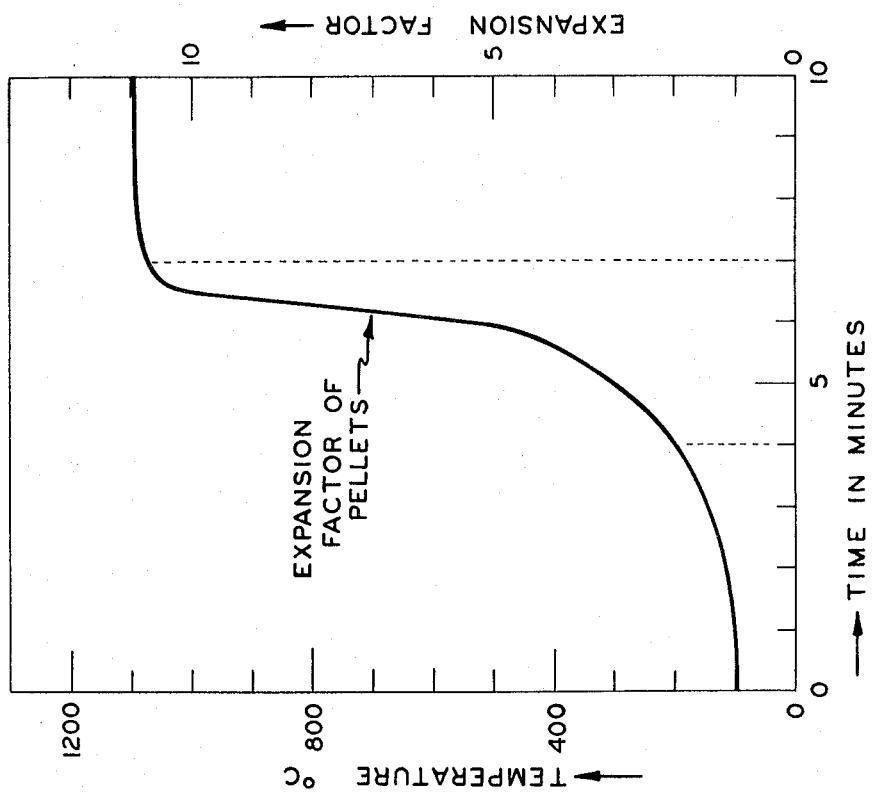

The criticality of this operating condition is illustrated in a test curve "C" in the graph shown in FIG. 6.

This test curve is for a clay of the following analytical data:

a. Chemical Composition In % Weight:

| | |
|---|---|
| $SiO_2$ | 50.1 |
| $Al_2O_3$ | 23.2 |
| $Fe_2O_3$ | 3.41 |
| FeO | 3.01 |
| MnO | 0.18 |
| MgO | 2.47 |
| CaO | 1.36 |
| $Na_2O$ | 0.20 |
| $K_2O$ | 2.89 |
| $P_2O_5$ | 0.21 |
| $TiO_2$ | 0.92 |
| $CO_2$ | 1.34 |
| $H_2O+$ | 7.80 |
| $H_2O-$ | 2.73 |
| C (organic) | 1.02 | b. Mineral Composition:

| | |
|---|---|
| Kaolmite: | much |
| Illite: | much |
| Montomorillonite | — |
| Vermiculite: | little |
| Quartz: | much |
| Feldspar | — |
| Siderite: | very little |
| Dolomite: | — |
| Pyrite: | — | c. Particle Size Distribution

| | |
|---|---|
| <2µ | 43.3 |
| 2–6.3µ | 31.1 |
| 6.3–2µ | 24.0 |
| 20–63µ | 1.0 |
| 63–200µ | 0.6 |
| >200µ | 0 |

In this graph the expansion factor (that is the rates of the original volume of the pellet to the expanded volume) is plotted as a function of the heat exposure time. The graph shows that the first 4 minutes produce only a small degree of increase in volume presumably due to internal loosening (crack formation) rather than to bloating or expansion. The actual expansion with its large increase in volume starts after about 4 minutes, and is completed after 7 minutes. Within 3 minutes the expansion factor changes from two to almost 10, thereafter remaining nearly constant.

Figure 7:
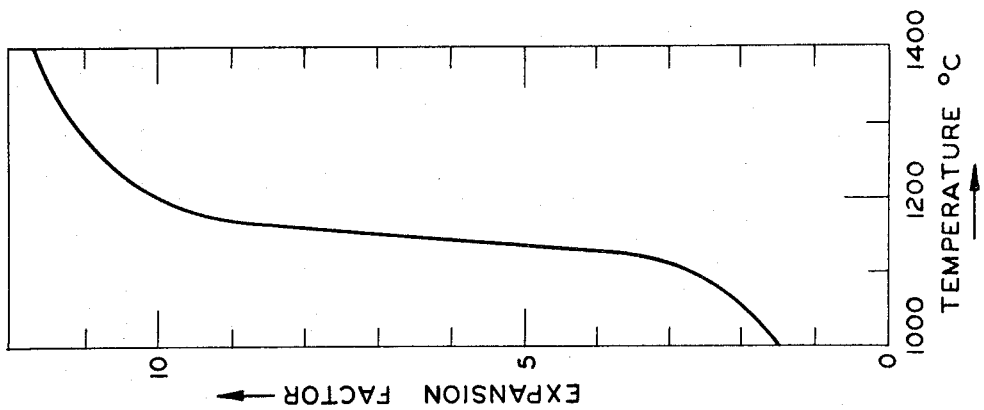
FIGS. 6 and 7 are graphs of test curves showing treatment characteristics of a certain clay material.

Complementary to FIG. 6, the curve on the graph of FIG. 7 for the same clay material has the expansion factor plotted as a function of the temperature in the treatment chamber.

These graphs indicate desirable expansion characteristics of the above defined clay material. Already at 1150° C. there appears an increase in volume adequate for practical purposes, coupled with good crush resistance. With higher temperatures the expansion increases further and presumably attains its maximum between 1400° and 1500°. This large temperature interval during which expansion occurs indicates that this clay becomes sufficiently pyroplastic already at a relatively low temperature, and that a further rising temperature provides only a small proportion of sintering. Gas evolution from the organic material in the pellet occurs over the entire temperature range. The above characteristics of this clay material are favorable insofar as the expanded product may be varied within wide limits by change of temperature. However, the crush resistance decreases with increased expansion due to increase of the voids in the porosity.

We claim:

1. The method of converting pellets prepared from expandable or heat bloatable clay material into expanded cellular light weight bodies or spheres sealed by an outer sintered skin, which method comprises maintaining a horizontally elongate bed of said material in a fluidized state in a heat treatment zone wherein said pellets are converted into expanded cellular bodies, feeding said prepared pellets at one end of said bed, delivering said prepared pellets at the other end of said bed, controlling the rate of feeding said pellets so as to control the length of treatment time during passage of the material from end to end of the fluidized bed, and thereby detaining said material in said heat treatment zone until converted into said expanded cellular bodies, supplying fluidizing gases to said bed, the velocity and the temperature of said gases being controlled to maintain the bed itself at a temperature below sintering temperature of the material, but sufficiently high to expand said pellets, and to maintain an everchanging top layer of the bed and causing the pellets constantly rising to the top of the bed to be exposed to additional heat effects directed downwardly onto the top face of the bed, the bed temperature being controlled by the temperature of the fluidizing gas, the exposure time being controlled by regulating the rate of feed of the pellets into the fluidized bed, and the upflow velocity of the gas being controlled to maintain the bed in a state of turbulence sufficient to maintain said everchanging top layer of the bed, applying supplemental heat by radiation directed downwardly onto the top face of the bed along at least a portion of the path of horizontal movement of the bed, and controlling the top surface temperature of the bed by controlling said radiant heat so that the pellets constantly rising to the top will receive radiant heat sufficient to raise the surface temperature of the pellets reaching the bed surface to the sintering temperature thereby sealing them individually in a skin of sintered material, without sticking of the finished pellets to each other or to walls of the fluidized bed.

2. The method according to claim 1, wherein the resulting expanded bodies are passed through an horizontally adjoining, but functionally separate zone of fluidization maintained by a supply of cooling gas.

3. The method according to claim 2, wherein the spent cooling gases are utilized for drying the pellets prior to feeding them to said fluidized bed.

* * * * *